F. P. NUCKLES.
AUTOMOBILE RADIATOR COVER.
APPLICATION FILED DEC. 20, 1915.
1,206,025.
Patented Nov. 28, 1916.
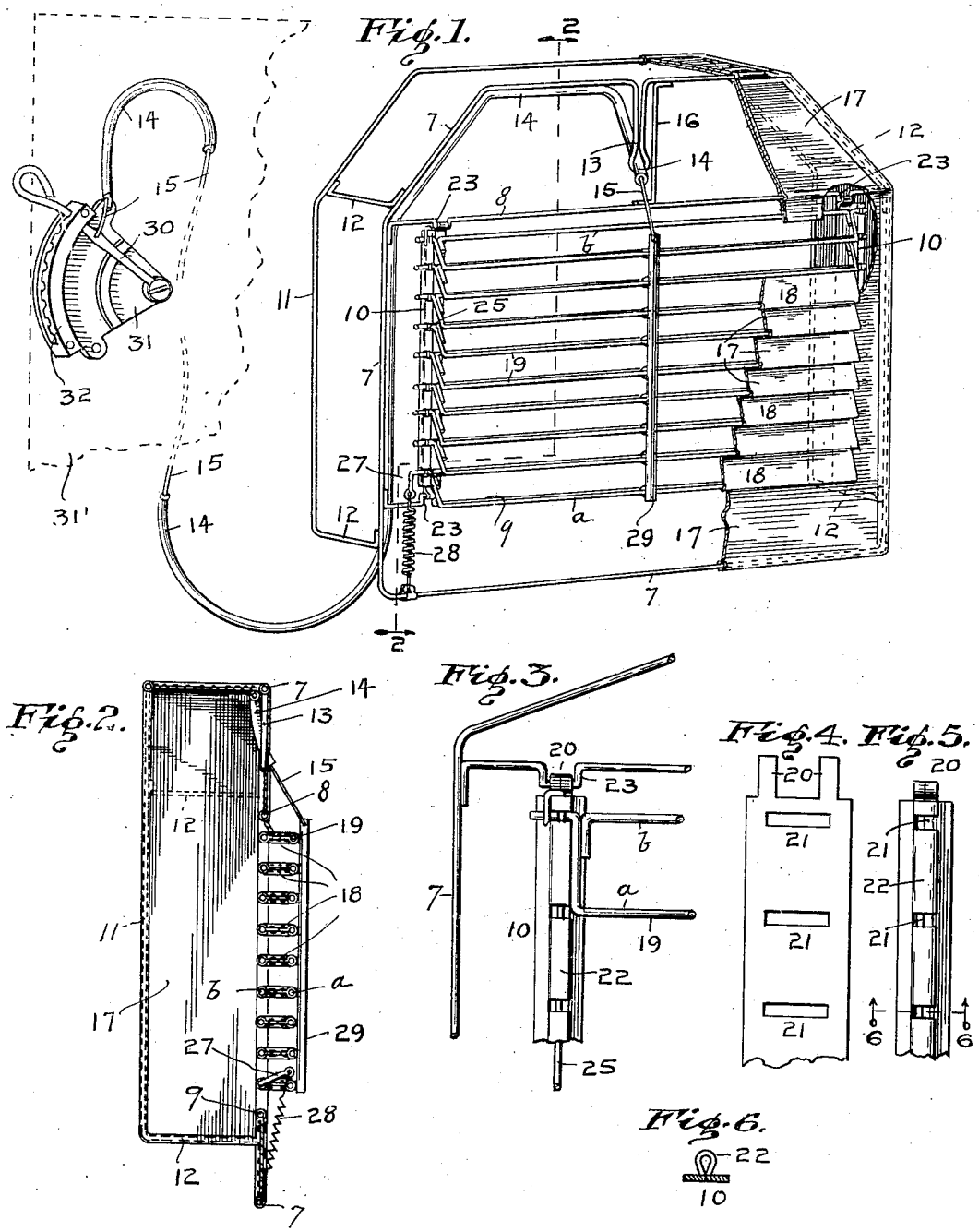
Witnesses
L. B. Woerner
Wm Hurte
Inventor,
Frank P. Nuckles,
By Minturn & Woerner,
Attorneys.

UNITED STATES PATENT OFFICE.

FRANK P. NUCKLES, OF INDIANAPOLIS, INDIANA.

AUTOMOBILE-RADIATOR COVER.

1,206,025. Specification of Letters Patent. Patented Nov. 28, 1916.

Application filed December 20, 1915. Serial No. 67,896.

*To all whom it may concern:*

Be it known that I, FRANK P. NUCKLES, a citizen of the United States, residing at Indianapolis, in the county of Marion and State of Indiana, have invented certain new and useful Improvements in Automobile-Radiator Covers, of which the following is a specification.

The object of this invention is to provide an adjustable damper-means for regulating the volume of air striking the front and sides of an automobile radiator, and to provide means for handily adjusting said damper-means by an occupant of the front seat of the automobile, which is particularly desirable with many machines now equipped with self-starters, making it unnecessary for the operator to go to the front of the automobile where the radiator is located, to crank the engine by hand. Under the latter conditions he could easily adjust a damper by hand; but if not required to go to the front of the automobile to start the engine it is convenient to be able to adjust a radiator damper from the seat station where the self-starter is controlled.

I accomplish the above and other objects which will hereinafter appear, by the mechanism illustrated in the accompanying drawings, in which—

Figure 1, is a perspective view of the skeleton or frame of my invention, with part of the covering intact, detached from the radiator, and also showing the manner in which it is connected up with operative means located on the automobile dash, which latter is indicated by dotted lines. Fig. 2 is a vertical cross-section on the line 2—2 of Fig. 1. Fig. 3, is a detail on a larger scale of a portion of the frame in front view, showing the manner of attaching and supporting the slats. Fig. 4 illustrates one end of a sheet metal blank from which the slat-supporting bar is formed. Fig. 5 shows the same after it is formed into the finished bar and Fig. 6 is a cross-section on the line 6—6 of Fig. 5.

Like characters of reference indicate like parts throughout the several views of the drawing.

The damper comprises a series of horizontal slats which are made to open and close an opening in the front of a hood which hood covers the front, top and sides of an automobile radiator. The shape of the hood corresponds to that of the radiator with which it is to be used, and is secured by a wire frame comprising a front marginal member 7, which supports two parallel and horizontal members 8 and 9, to which slat-holding, vertical bars 10, 10, are fastened. The frame also comprises a rear member 11 which is retained in parallel relation to the front member 7, by the horizontal bars 12. All joints in the frame are welded, brazed, or soldered in a secure manner. The top bar of the frame member 7 is bent to form a depending loop 13 which will support the front end of a metal tube 14, through which a slat-operating wire or cable 15 passes. A vertical brace 16, extends from said top bar to the horizontal frame member 8, to brace and stiffen the structure. All of the frame as thus described, with the exception of the space bounded by the members 8, 9, 10 and 10, is covered with leather, cloth, or other suitable material 17, preferably in two—inner and outer—thicknesses, all securely stitched and bound at the corners. The open front space above mentioned, is controlled by slats 18, here shown as comprising a wire frame 19, covered with the same material 17, as used on the rest of the hood. The frame 19 is preferably made out of two wires, the lower one $a$ of which is bent at right angles at each end of the slat and then outwardly at a distance from the first bend equal to the width of the slat, to form the slat hinges, and a second wire $b$, connecting the ends of the slat on a line with said hinge portions.

The bars 10, 10, which support the slats 18, are preferably, for stiffness, strength, and economy of manufacture, formed out of sheet metal straps formed with a pair of tongues 20, at each end, and with transverse slots 21, after which the strap is bent longitudinally and centrally to form a loop 22, with the material at the edges of the loop forming flanges in a common plane, as clearly shown in Fig. 2. The pair of tongues 20, at each end, are brought together and they are then formed into eyes through which the respective horizontal frame wires 8 and 9, are passed to fasten the bars 10 $'$ the frame of the hood. The members 8 and 9 will preferably be bent to form cranks 23 where the eyes of the bars 10 are fastened, so as to hold the bars against longitudinal movement on said horizontal members.

The slots 21 in the flat blanks form notches in the loop 22, into which the hinges of the slats 18 are inserted, and the accidental removal of the hinges is prevented by threading a wire 25 longitudinally through the loop from its top, all in the manner clearly shown in the drawing. A hook at the end of wire 25 keeps it from passing down too far, and also serves as a handle for its removal. The hinge on the lower slat-frame is extended and bent to form a crank 27. A spring 28 is fastened at one end to the outer end of the crank and its other to the lower cross bar of the frame of the hood, whereby all of the slats, which are connected by a bar 29, which is hinged to each, are normally closed by the action of the spring.

I open the slats by pulling on the wire (cord or cable) 15, an end of which is made fast to the upper end of the bar 29. The required pull on the wire 15 is obtained by fastening the other or inner end of the wire to a lever 30, pivoted to a plate 31, which plate is secured in a fixed manner to the dash of the automobile (shown by dotted lines 31', Fig. 1) within convenient reach of the driver. The plate will have a segmental rack 32, between which and the plate the lever will pass. The lever will be of spring metal strained toward the rack so as to lock automatically at any given position. The wire 15, as first stated, will pass through a metal tube 14. The end of the tube is fastened to the plate 31, whereby the wire will be drawn through it by the lever in one direction and by the spring in the other. The tube and wire are both flexible and may be bent freely in any direction in installing the apparatus on an automobile. The slats may be raised and held at any desired position, and when released will be closed by the spring.

Having thus fully described my invention, what I claim as new and wish to secure by Letters Patent of the United States, is—

1. In a radiator hood, a frame, a flexible covering therefor having a front ventilating opening, horizontal wires above and below the opening secured to the frame and having portions cranked toward each other near the vertical edges of the opening, slats having end hinge-stubs, a support for said hinge-stubs formed of metal strips bent centrally and longitudinally to form U-shaped flanges, said flanges being slotted to receive the hinge-stubs, eyes at the ends of the metal straps connecting the latter with the cranks of the horizontal wires, and wires longitudinally of the U-shaped flanges to retain the hinge-stubs.

2. A radiator hood comprising a front and integral top and side member at right angles to the front formed of a wire skeleton-frame at the angles and margins, a covering of flexible material, the covering for the front of the hood having a ventilating opening, horizontal wires near the top and bottom of the opening secured to the frame, said wires having cranked bends toward each other, slats for said opening end hinge-stubs and supports for the latter comprising metal straps bent longitudinally to form U-shaped flanges which flanges are notched to receive the hinge-stubs, fastening wires longitudinally of the U-shaped flanges to retain the hinge-stubs and means to secure the metal straps to the horizontal wires at the cranked portions of the latter.

3. A supplemental hood for an automobile comprising a wire frame and a flexible covering, said hood having a ventilating opening and said hood adapted to be applied to the outer surface of the automobile radiator, a damper comprising a plurality of slats hinged to the frame of the hood and adapted to close the ventilating opening, a bar hingedly connecting all of the slats together, means to automatically close the slats, a lever pivoted to the automobile dash, a cable connecting the lever with the bar connecting said slats and a flexible tube surrounding the cable and fixed at an end adjacent to the lever.

In witness whereof, I have hereunto set my hand and seal at Indianapolis, Indiana, this 29th day of November, A. D. one thousand nine hundred and fifteen.

FRANK P. NUCKLES. [L. S.]

Witness:
J. A. MINTURN.